Patented Aug. 9, 1932

1,870,357

UNITED STATES PATENT OFFICE

ALFRED DIERICHS, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY

NEW CATALYSTS

No Drawing. Original application filed January 21, 1930, Serial No. 422,379, and in Germany January 28, 1929. Divided and this application filed December 23, 1930. Serial No. 504,413.

The present invention relates to new catalysts.

It is known that acetic anhydride is produced catalytically from glacial acetic acid; the technically important catalysts used therefor are alkali metal phosphates, especially secondary alkali metal phosphates, which suffer from the disadvantage that they react alkaline, which alkaline reaction causes the acetic acid to split up into carbon, methane and carbon dioxide. Since the alkalinity of the catalyst steadily rises by a splitting off of phosphoric acid the decomposition of the acetic acid vapor continues to increase with the result that the efficacy of the catalyst fails after some hours time.

I have found that catalysts containing boron phosphate—a complex compound of boric anhydride and phosphorus pentoxide—besides alkali metal salts, especially alkali metal phosphates, have a much longer life than the catalysts used heretofore. These new catalysts have the further advantage that only little decomposition of the acetic acid by splitting off of carbon is produced and that they can be readily regenerated by igniting in the air when after a long duration of catalyzation they become covered by carbon. The catalysts form white porous substances which catalyze the production of anhydride from acetic acid vapor at about 400–800° C.

The preparation of the catalysts can be performed in the most simple manner, for example, by thoroughly heating a mixture of boron phosphate and an alkali metal salt for some time, say about one hour, at between about 600–900° C. Another way for preparing the catalysts is by dissolving the alkali metal salts in water then adding the boron phosphate, evaporating to dryness on the water bath and calcining the substance thus obtained as described above.

As alkali metal salts I prefer to use phosphates, but also carbonates, borates, hydroxides and so on may be used with the same effect.

The invention is illustrated by the following examples without being restricted thereto:—

*Example 1.*—200 grams of acid sodium ammonium phosphate are dissolved in 2 liters of water and 1 kg. of boron phosphate is added to the solution. After evaporating to dryness on the water bath and then heating in a crucible to 700° C. a porous white substance is obtained.

Acetic acid vapor is passed over this substance as a catalyst at 600–620° C. with a velocity of 1.5 kg. per hour. A yield of 48–50% of acetic anhydride is thus obtained calculated on the initial acetic acid.

*Example 2.*—100 grams of $Na(NH_4)H.PO_4$ and 100 grams of primary lithium phosphate are dissolved in 2 liters of water and to this 1 kg. of boron phosphate is added. After evaporating to dryness the product thus obtained is heated in a crucible to 700° C. A porous white substance is obtained which, when used as a catalyst as described in Example 1, leads to the same yield.

*Example 3.*—200 grams of borax are dissolved in 2 liters of water and 1 kg. of boron phosphate is added. After evaporation, heating is effected to 700° C. A porous white product is obtained which is employed as a catalyst as described in Example 1 with equal effect.

*Example 4.*—100 grams of sodium hydroxide and 100 grams of lithium hydroxide are dissolved in 2 liters of water and 1 kg. of boron phosphate is added to this solution, thereafter evaporation on the water bath takes place. The product is then calcined at 1000° C. and a porous white product is obtained. This product is employed as described in Example 1 and leads to the same yield.

*Example 5.*—100 grams of finely powdered boron phosphate, 100 grams of finely powdered sodium-meta-phosphate and 100 grams of finely powdered lithium-meta-phosphate are well mixed and heated for about 1 hour to about 800–900° C. A clear melt is obtained, which begins to soften at 450° C. and which is easily fusible above this temperature.

By passing acetic acid vapor through the molten catalyst at temperatures between about 700 and 750° C. 50 to 60% of the theory of acetic anhydride are obtained.

This is a division of my copending application Serial No. 422,379, filed January 21, 1930.

I claim:—

1. A catalyst consisting of at least one alkali metal salt and boron phosphate.

2. A catalyst consisting of at least one alkali metal phosphate and boron phosphate.

3. A catalyst consisting of about equal parts of boron phosphate, sodium-meta-phosphate and lithium-meta-phosphate.

4. A catalyst consisting of at least one alkali metal borate and boron phosphate.

5. A catalyst consisting of borax and boron phosphate.

6. A catalyst consisting of at least one alkali metal hydroxide and boron phosphate.

7. A catalyst consisting of sodium hydroxide, lithium hydroxide and boron phosphate.

In testimony whereof, I affix my signature.

ALFRED DIERICHS.